US006940433B2

(12) United States Patent
Tazartes et al.

(10) Patent No.: US 6,940,433 B2
(45) Date of Patent: Sep. 6, 2005

(54) MODULATION METHOD FOR SIGNAL CROSSTALK MITIGATION IN ELECTROSTATICALLY DRIVEN DEVICES

(75) Inventors: Daniel A. Tazartes, West Hills, CA (US); John G. Mark, Pasadena, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/714,199

(22) Filed: Nov. 14, 2003

(65) Prior Publication Data

US 2005/0104756 A1 May 19, 2005

(51) Int. Cl.$^7$ .................................................. H03M 1/20
(52) U.S. Cl. .................................... 341/131; 73/504.16
(58) Field of Search ....................... 341/131; 73/504.16, 73/504.04, 504.12, 504.14, 862.59, 504.13, 504.15; 310/309

(56) References Cited

U.S. PATENT DOCUMENTS 4,354,393 A 10/1982 Acker et al.
4,480,215 A 10/1984 Bax
5,225,889 A * 7/1993 Fritze et al. ................ 356/476
6,276,204 B1 * 8/2001 Townsend ................ 73/504.12
6,343,509 B1 2/2002 Fell et al.
6,401,534 B1 6/2002 Fell et al.
6,817,244 B2 * 11/2004 Platt ........................ 73/504.16
2002/0020219 A1 2/2002 DeRoo et al.

FOREIGN PATENT DOCUMENTS

WO WO 01/22094 3/2001

* cited by examiner

*Primary Examiner*—Brian Young

(57) ABSTRACT

A method of distinguishing an analog drive signal from a pickoff signal for attenuating the effect of electrical cross-coupling between the analog drive signal and the pickoff signal. The method may include receiving a periodic digital signal at a first frequency in the form of a stream of digital data values, randomly inverting at least one of the digital data values and converting the stream of digital data values to a stream of analog data values to form an analog drive signal. The method may also include driving a sensor, physically coupled to a resonant member configured to oscillate at a second frequency, using the analog drive signal and sensing changes in the movement of the resonant member detected by the sensor for producing a pickoff signal.

20 Claims, 4 Drawing Sheets

BLOCK DIAGRAM OF EXCITATION & SENSING

MODULATION METHOD FOR SIGNAL CROSSTALK MITIGATION IN ELECTROSTATICALLY DRIVEN DEVICES

BACKGROUND OF THE INVENTION

1. Field of the Invention

The present invention relates generally to a method for reducing the effect of electrical cross-coupling in micro-electromechanical systems, and more particularly to a modulation method for signal crosstalk mitigation in electrostatically driven devices.

2. Description of the Related Art

A micro-electromechanical system (MEMS) may be used to sense the changes in rotation of a resonant element, among other things, and may be fabricated using a variety of different structures (e.g., gyroscopes) as the resonant element. FIG. 1 is a block diagram of a prior art MEMS 100, which typically uses a primary device 105 having an electrostatic capacitive drive that receives excitation drive signals and produces a primary vibratory motion as detected by a primary pickoff signal (e.g., an oscillatory signal). The characteristics (e.g., amplitude and phase) of the primary pickoff signal may be sensed and controlled using a primary pickoff sensing device 110, which outputs an excitation motion measurement, which is used to set the basic motion amplitude. The primary device 105 may be coupled to a secondary device 115 (e.g., a Coriolis vibratory rate sensor) for producing a secondary vibratory motion responsive to an external parameter (e.g., angular rate in the case of a gyro). Such motion may be sensed and controlled using a secondary pickoff sensing device 120. The secondary pickoff sensing device 120 may be used to measure the characteristics of the secondary pickoff signal and may provide an open loop output at, for example, 2,000 Hz.

The MEMS 100 may also include a nulling servo 125 whose input is coupled to the secondary pickoff sensing device 120 and whose output is coupled to the secondary device 115. The nulling servo 125 receives the secondary pickoff signal and generates an oscillatory feedback signal that is used to null the secondary pickoff signal as sensed by the secondary pickoff sensing device 120. Consequently, a feedback signal, which becomes the measurement of the desired characteristic (e.g., angular rate measurement for a gyroscope) is produced at the output of the nulling servo 125 and is fed into the secondary device 115. The nulling servo 125 may also produce a closed-loop output.

The primary and secondary devices 105, 115 may include high Q mechanical systems that are used to provide mechanical amplification of the primary vibratory signal or the secondary vibratory signal or both. The high Q mechanical systems have peak responses at the resonant frequency leading to oscillatory motion that is substantially sinusoidal. Therefore, in either the open loop or closed loop configuration, the primary and secondary pickoff signals may be demodulated to extract or remove the excitation frequency (i.e., amplitude and phase) of the motion and obtain a measure of the motion carried by the excitation drive signal.

One drawback of conventional MEMS is the problems associated with electrical cross-coupling. Electrical cross-coupling often occurs because the MEMS devices and structures are very small and produce stray capacitances that are significant compared to the actual variable capacitance used for the primary and secondary pickoff signals. Also, the primary and secondary pickoff signals are much smaller than the excitation drive signal. Hence, electrical cross-coupling of the excitation drive signals into the primary and secondary pickoff signals is very likely and generally unavoidable. Thus, it should be appreciated that there is a need for a method for reducing the effect of electrical cross-coupling in micro-electromechanical systems. The present invention fulfills this need as well as others.

SUMMARY OF THE INVENTION

In one embodiment, the invention is a method of decoupling a drive signal from a pickoff signal to attenuate the effect of electrical cross-coupling between the drive signal and the pickoff signal. The method may include providing a drive signal at a first frequency that is represented by a plurality of data values, altering at least one of the plurality of data values of the drive signal and producing a pickoff signal at a second frequency.

In one embodiment, the invention is a method of distinguishing an analog drive signal from a pickoff signal for attenuating the effect of electrical cross-coupling between the analog drive signal and the pickoff signal. The method may include receiving a periodic digital signal at a first frequency in the form of a stream of digital data values, randomly inverting at least one of the digital data values and converting the stream of digital data values to a stream of analog data values to form an analog drive signal. The method may also include driving a sensor, physically coupled to a resonant member configured to oscillate at a second frequency, using the analog drive signal and sensing changes in the movement of the resonant member detected by the sensor for producing a pickoff signal.

In one embodiment, the invention is a method of distinguishing a drive signal from a pickoff signal for attenuating the effect of electrical cross-coupling between the drive signal and the pickoff signal. The method may include receiving an input signal at a first frequency in the form of a plurality of data values, randomly changing the polarity of at least one of the plurality of data values of the input signal to form a sensor drive signal and configuring a resonant member to oscillate at a second frequency. The method may also include driving a sensor, physically coupled to the resonant member, using the sensor drive signal and detecting movements of the resonant member by the sensor for producing a pickoff signal.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Figure 1:
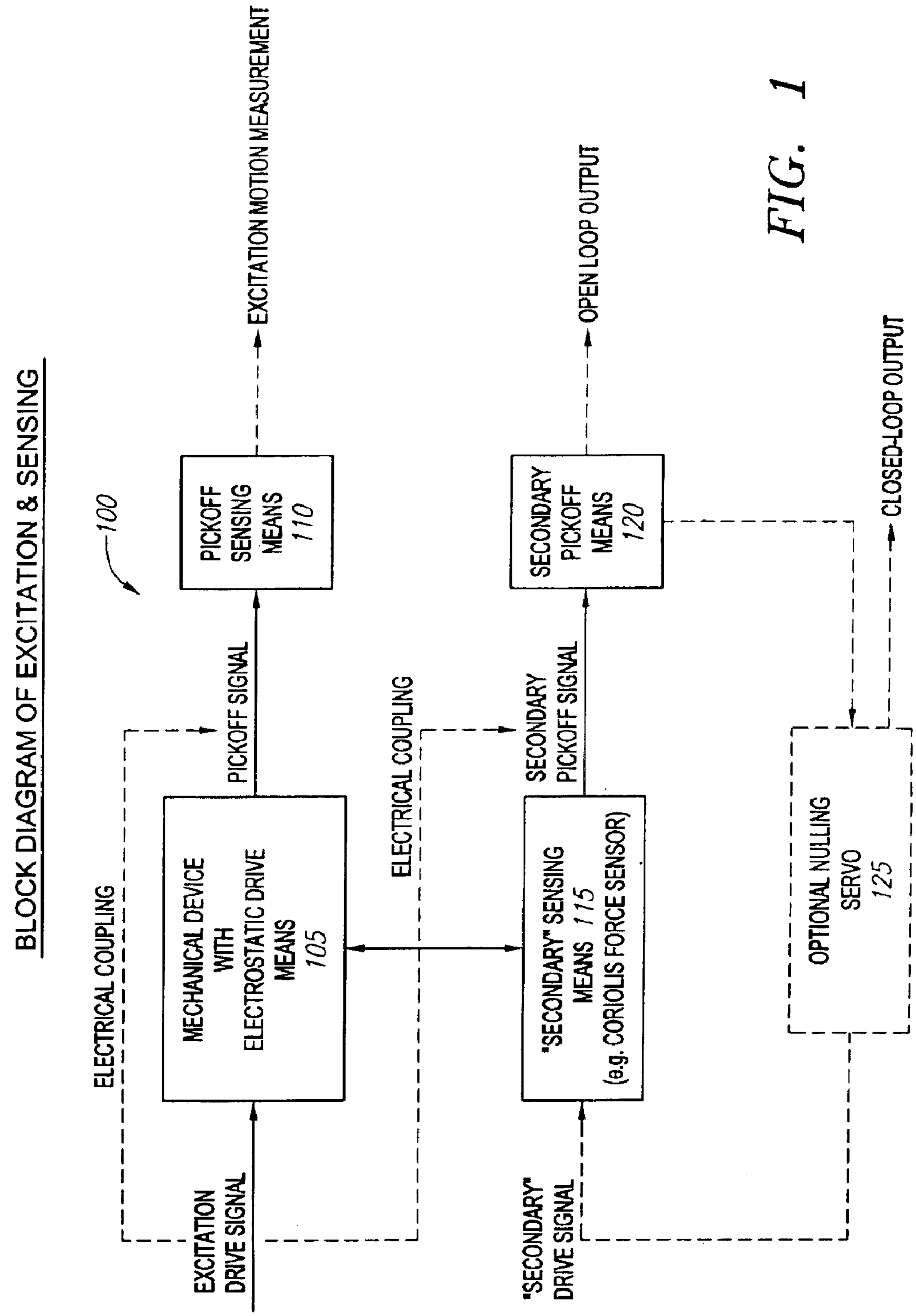
FIG. 1 is a block diagram of a prior art micro-electromechanical system, which typically uses a primary device having an electrostatic capacitive drive that receives excitation drive signals and produces a primary pickoff signal.

Devices that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

The primary device 105 and the secondary device 115 may be excited by applying a biased excitation signal or voltage, such as $V=V_0+V_e \cos \omega t$, to the input of the device. For devices operating at high Q with resonance at or near angular frequency ω, the cos ωt term may provide most of the mechanical excitation resulting in excitation motion at or near angular frequency ω. Thus, the excitation voltage and the excitation motion are at substantially the same frequency. In this situation, the primary pickoff sensing device 110 may sense a small motion signal at the angular frequency ω. In addition, the primary pickoff sensing device 110 may sense a large excitation signal that has been introduced into the primary pickoff signal due to electrical cross-coupling. Since the excitation voltage is at substantially the same frequency as the excitation motion, the excitation voltage may be incorrectly interpreted as the excitation motion.

The half-frequency sinusoidal signal may be an un-biased excitation voltage having the formula $V=V_e \cos \frac{1}{2} \omega t$. Due to the nature of voltage excitation of a capacitive forcer, the effective physical excitation will be proportional to the square of the applied voltage. Consequently, physical excitation will occur substantially at the second harmonic of the drive frequency. The primary device 105 and the secondary device 115 generally operate at high Q with resonance at or near angular frequency ω. Therefore, the excitation voltage is at a different frequency than the excitation motion. That is, the excitation voltage is at angular frequency ½ω while the excitation motion is at angular frequency ω. Hence, the electrical cross-coupling resulting from the excitation drive signal will not appear as excitation motion to the primary pickoff sensing device 110 because the frequencies differ by 2 to 1. However, if any distortion is present in the excitation drive signal, the second harmonic of the excitation drive signal coupled into the primary pickoff signal will again appear erroneously as excitation motion. This may be particularly problematic in the case of a digital drive waveform, which may have substantial harmonic content.

Figure 2:
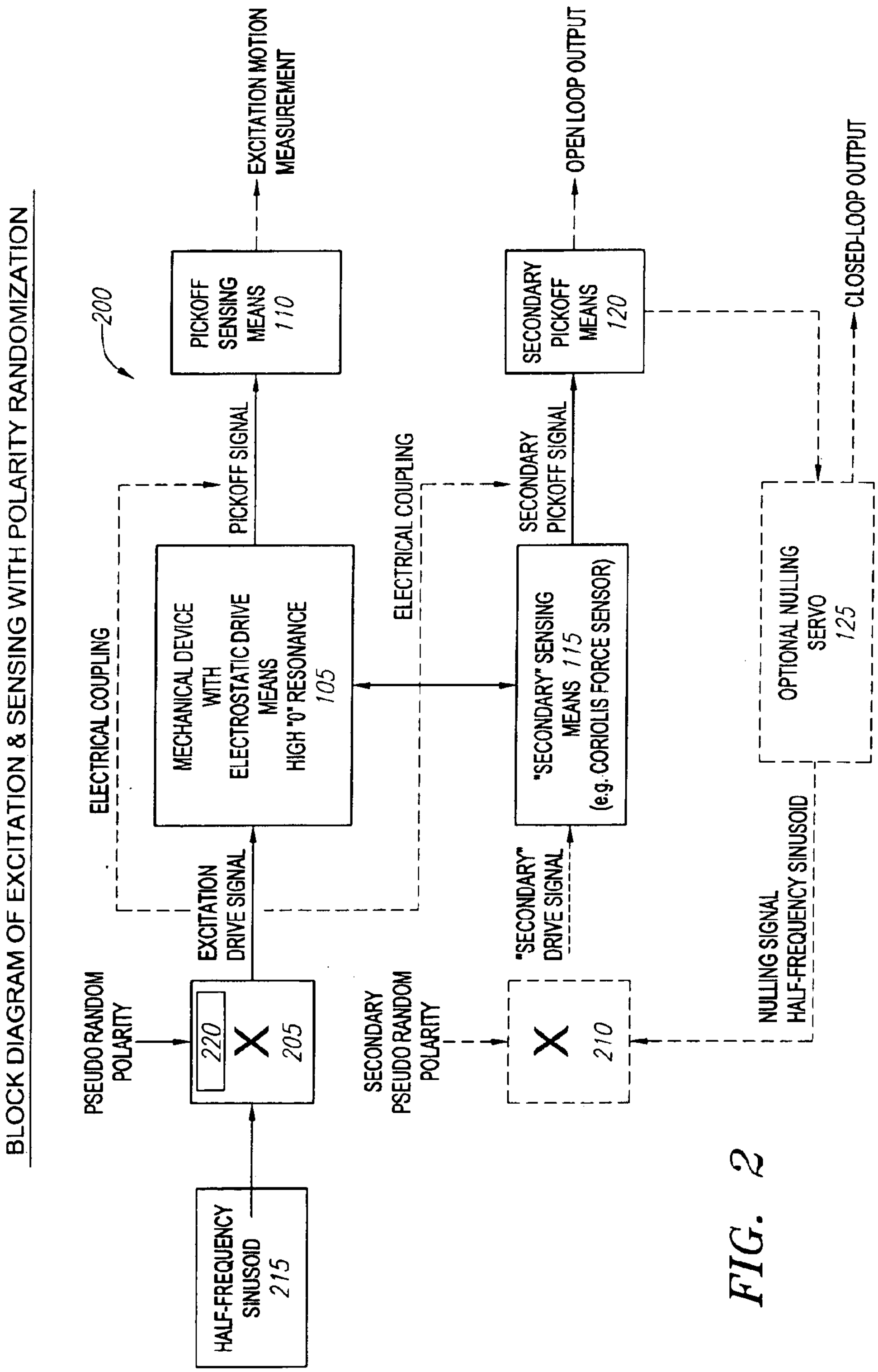
FIG. 2 is a block diagram of a MEMS having a primary random polarity inverter, a secondary random polarity inverter and a signal generator for generating a half-frequency sinusoidal signal that is fed into the primary random polarity inverter in accordance with an embodiment of the present invention.
Figure 3:
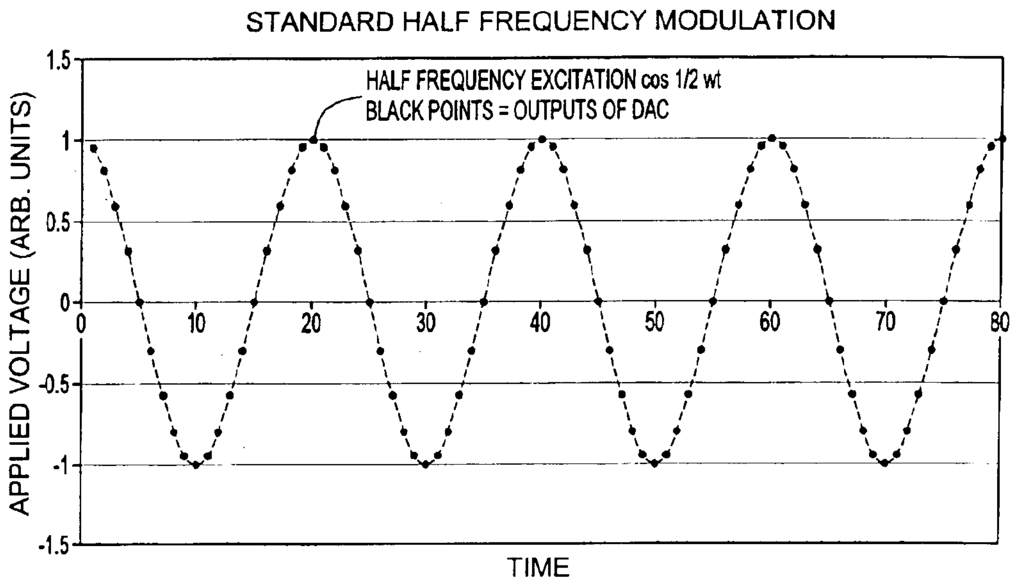
FIG. 3 is a graph showing a half-frequency sinusoidal signal in accordance with an embodiment of the present invention.

FIG. 2 is a block diagram of a MEMS 200 having a primary random polarity inverter 205, a secondary random polarity inverter 210 and a signal generator 215 for generating a half-frequency sinusoidal signal ($V_c \cos \frac{1}{2} \omega t$) as shown in FIG. 3 that is fed into the primary random polarity inverter 205. The functions and structure of the primary random polarity inverter 205 may be the same as the functions and structure of the secondary random polarity inverter 210. Therefore, for simplicity, only the functions and structure of the primary random polarity inverter 205 will be described. The primary random polarity inverter 205 receives a half-frequency sinusoidal signal from the signal generator 215 and multiplies the half-frequency sinusoidal signal by a −1 or +1 to produce an excitation drive signal. The half-frequency sinusoidal signal may be represented by a plurality of digital data values or a plurality of analog (continuous) data values. The excitation drive signal may be represented by the formula $V=s(t)*V_c \cos \frac{1}{2} \omega t$, where $s(t)=\pm 1$ randomly with the constraint that the mean value $\overline{s(t)}=0$. The force, which is represented by the equation $F \propto \frac{1}{2} V^2 e(1+\cos \omega t)$, is independent of s(t) since the voltage squared eliminates the polarity dependence. The randomization process advantageously allows the excitation drive signal to be made incoherent from the excitation motion at angular frequency ω, thus eliminating the possibility that the excitation drive signal may be erroneously interpreted as excitation motion. That is, the electrical cross coupling from the excitation drive signal will not be interpreted as excitation motion because the excitation motion occurs at or near the angular frequency ω.

The primary random polarity inverter 205 may include a selective inverter 220 for randomly or pseudo-randomly inverting the excitation drive signal. That is, the selective inverter 220 may randomly or pseudo-randomly invert one of more of the digital or analog digital values representing the excitation drive signal. In one embodiment, the selective inverter 220 may be a switch that randomly or pseudo-randomly switches from a +1 state to a −1 state. In one embodiment, the selective inverter 220 may include a digital controller for periodically sampling the half-frequency sinusoidal signal to obtain a digital value and for randomly or pseudo-randomly generating a sign inversion for the digital value and a digital-to-analog converter for receiving the digital value and for generating an excitation drive signal using the digital values to drive the primary device 105. The points shown on the half-frequency sinusoidal signal in FIG. 3 may represent points being output from the digital-to-analog converter. The digital controller may randomly or pseudo-randomly determine whether to invert a particular point(s) of the half-frequency sinusoidal signal. One advantage of pseudo-random generation is the possibility of producing an equal number of +1 states and −1 states over a pre-defined period of time. Other devices for inverting the half-frequency sinusoidal signal may include linear feedback shift registers or other well known pseudorandom bit generators for selecting polarity.

Figure 4:
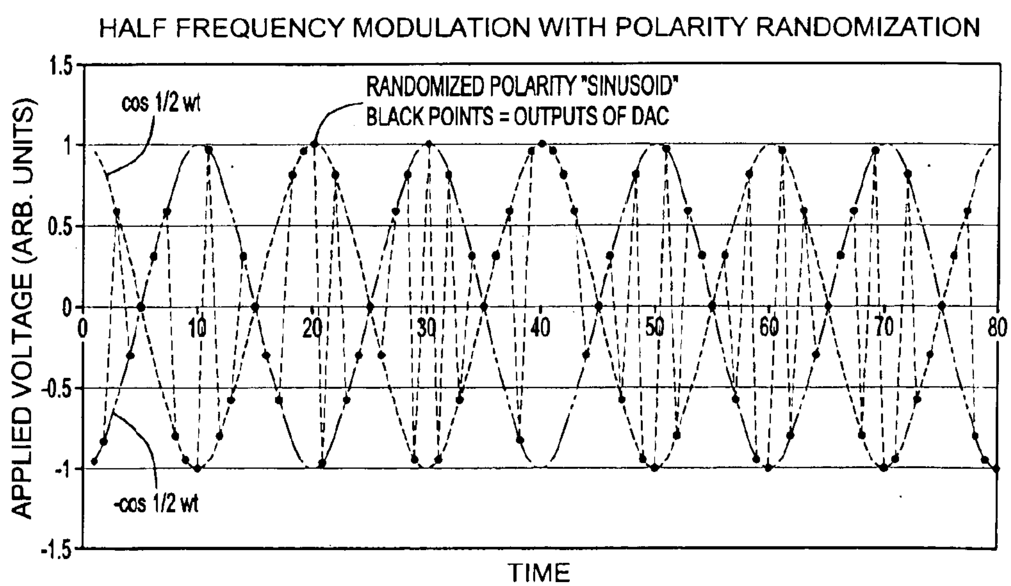
FIG. 4 is a graph showing a half-frequency sinusoidal signal with polarity randomization in accordance with an embodiment of the present invention.

FIG. 4 is a graph showing a half-frequency sinusoidal signal with polarity randomization performed by the primary random polarity inverter 205. As shown in FIG. 4, the polarity inversion may be represented by the dashed lines. That is, each dashed line represents a polarity inversion. For example, the polarity of the third point on the graph has been inverted and therefore, a dashed line is shown from the second point to the third point indicating an inversion from negative to positive and a dashed line is shown from the third point to the fourth point indicating an inversion from positive to negative. In another example, the polarity of the eighth, ninth and tenth points on the graph has been inverted and therefore, a dashed line is shown from the seventh point to the eighth point indicating an inversion from positive to negative and a dashed line is shown from the tenth point to the eleventh point indicating an inversion from negative to positive. As shown, the polarity of each point may be randomly or pseudo-randomly inverted.

Figure 5:
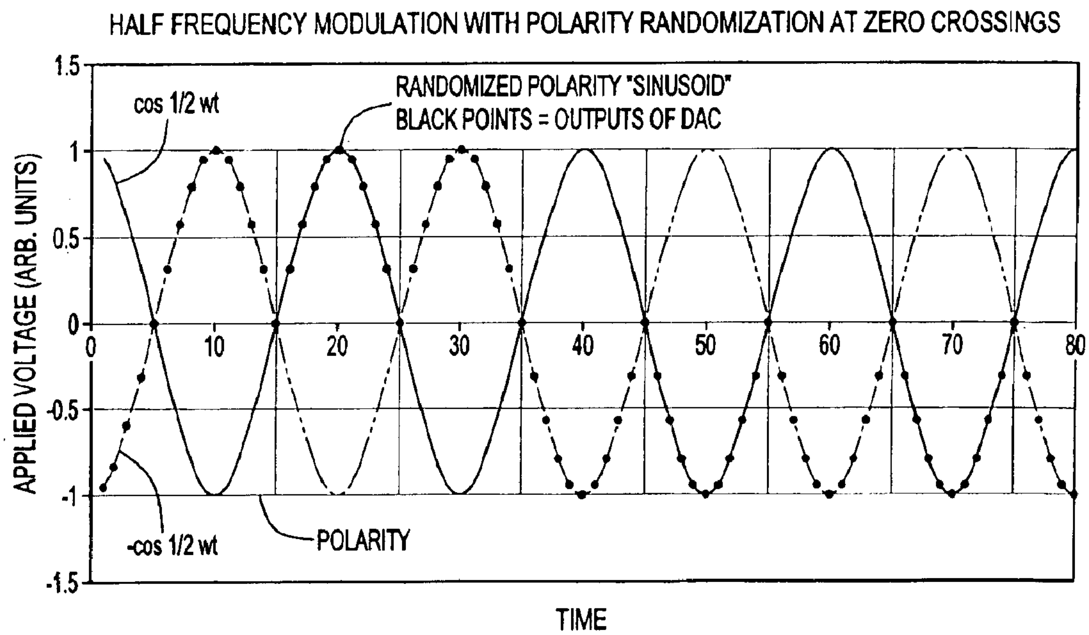
FIG. 5 is a graph showing a half-frequency sinusoidal signal with polarity randomization at or near zero crossings in accordance with an embodiment of the present invention.

FIG. 5 is a graph showing a half-frequency sinusoidal signal with polarity randomization at or near zero crossings performed by the primary random polarity inverter 205. In one embodiment, the primary random polarity inverter 205 may randomly or pseudo-randomly invert the signal every half-cycle at or near zero crossings of the half-frequency sinusoidal signal. The primary random polarity inverter 205 may or may not switch the polarity every half-cycle. As shown in FIG. 5, the polarity inversion has been performed on the second, fifth and seventh half-cycles.

The polarity inversion at or near zero crossings prevents switching between large positive and negative values. The large excursions from a positive value to a negative value may cause noise spikes. To prevent large excursions, the primary random polarity inverter 205 may hold the polarity constant for at least approximately a half-cycle of the half-frequency sinusoidal signal. To achieve the constant polarity for the half-cycle, the primary random polarity inverter 205 may determine whether the current value of the half-frequency sinusoidal signal is at or near the zero crossing and if so, may randomly or pseudo randomly switch the polarity for the remaining values until the next zero crossing point is detected at which point the primary random polarity inverter 205 may switch the polarity. Since the polarity is randomly or pseudo randomly switched, the polarity may be the same for several successive cycles, switch from −1 to +1 for each half-cycle or alternate in a random or pseudo random manner. In one embodiment, the primary random polarity inverter 205 may switch the polarity at or near zero crossings of the full cycle of the half-frequency sinusoidal signal.

The nulling signal, output from the nulling servo 125, may be a half-frequency sinusoidal signal that may be input into the secondary random polarity inverter 210 to produce a secondary drive signal that is input into the secondary device 115. The random polarity used by the secondary random polarity inverter 210 should be different from the random polarity used by the primary random polarity inverter 205 to ensure that the excitation drive signal does not correlate with the secondary drive signal. This prevents electrical cross-coupling from the excitation drive signal from being interpreted as the secondary drive signal.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A method of decoupling a drive signal from a pickoff signal to attenuate the effect of electrical cross-coupling between the drive signal and the pickoff signal, the method comprising:

providing a drive signal at a first frequency that is represented by a plurality of data values;

altering at least one of the plurality of data values of the drive signal; and producing a pickoff signal at a second frequency different from the first frequency of the drive signal;

whereby the pickoff signal is distinguished from any cross-coupled drive signal.

2. The method as defined in claim 1, further comprising:

providing a secondary drive signal that is derived from the drive signal;

applying a first polarity randomization to the drive signal; and applying a second polarity randomization to the secondary drive signal.

3. The method as defined in claim 2, wherein:

the first polarity randomization is substantially identical to the second polarity randomization; and the first polarity randomization is applied at substantially the same time as the second polarity randomization.

4. The method as defined in claim 1, wherein:

the drive signal is a half-frequency sinusoidal signal and the plurality of data values are analog data values or digital data values; and the altering at least one of the plurality of data values includes inverting the at least one of the plurality of data values.

5. The method as defined in claim 1, wherein the first frequency is about ½ω and the second frequency is about ω.

6. The method as defined in claim 1, wherein the altering at least one of the plurality of data values includes randomly or pseudo-randomly inverting at least one of the plurality of data values.

7. The method as defined in claim 1, wherein the altering at least one of the plurality of data values includes randomly or pseudo-randomly switching from a positive state to a negative state or from a negative state to a positive state at least one of the plurality of data values.

8. The method as defined in claim 1, wherein the altering at least one of the plurality of data values occurs at approximately a zero crossing of the drive signal.

9. The method as defined in claim 1, wherein the altering at least one of the plurality of data values occurs for at least approximately a half-cycle of the drive signal.

10. The method as defined in claim 1, wherein the altering at least one of the plurality of data values occurs for at least approximately an integer number of half cycles of the drive signal.

11. A method of distinguishing an analog drive signal from a pickoff signal for attenuating the effect of electrical cross-coupling between the analog drive signal and the pickoff signal, the method comprising:

receiving a periodic digital signal at a first frequency in the form of a stream of digital data values;

randomly inverting at least one of the digital data values;

converting the stream of digital data values to a stream of analog data values to form an analog drive signal;

driving a sensor, physically coupled to a resonant member configured to oscillate at a second frequency, using the analog drive signal; and sensing changes in the movement of the resonant member detected by the sensor for producing a pickoff signal.

12. The method as defined in claim 11, wherein the randomly inverting at least one of the digital data values occurs at approximately a zero crossing of the periodic digital signal.

13. The method as defined in claim 11, wherein the randomly inverting at least one of the digital data values occurs for at least approximately a half-cycle of the periodic digital signal.

14. The method as defined in claim 11, wherein the randomly inverting at least one of the digital data values occurs for at least approximately an integer number of half cycles of the periodic digital signal.

15. The method as defined in claim 11, wherein the randomly inverting at least one of the digital data values includes randomly or pseudo-randomly switching at least one of the digital data values from a positive number to a negative number or from a negative number to a positive number.

16. A method of distinguishing a drive signal from a pickoff signal for attenuating the effect of electrical cross-coupling between the drive signal and the pickoff signal, the method comprising:

receiving an input signal at a first frequency in the form of a plurality of data values;

randomly changing the polarity of at least one of the plurality of data values of the input signal to form a sensor drive signal;

driving a sensor, physically coupled to a resonant member, using the sensor drive signal; and detecting movements of the resonant member by the sensor for producing a pickoff signal.

17. The method as defined in claim 16, further comprising receiving a secondary input signal in the form of a plurality of data values.

18. The method as defined in claim 16, further comprising configuring the resonant member to oscillate at a second frequency.

19. The method as defined in claim 16, wherein the resonant member is selected from a group consisting of a micro-electromechanical system and a gyroscope.

20. The method as defined in claim 16, wherein the randomly changing the polarity of at least one of the plurality of data values includes randomly changing the polarity of all the data values within a defined half-cycle of the input signal.

* * * * *